(12) United States Patent
Goodman et al.

(10) Patent No.: US 7,988,179 B1
(45) Date of Patent: Aug. 2, 2011

(54) TOW BAR HAVING ORTHOGONALLY-ARTICULATED TOWED-VEHICLE CONNECTORS

(75) Inventors: Steven Goodman, Pender, NE (US);
David Merchant, Lincoln, NE (US);
James Huston, Yankton, SD (US); Les Roeber, Emerson, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 244 days.

(21) Appl. No.: 12/386,203

(22) Filed: Apr. 15, 2009

(51) Int. Cl.
*B60D 1/167* (2006.01)

(52) U.S. Cl. ............... 280/491.4; 280/456.1; 280/491.2; 280/494

(58) Field of Classification Search .... 280/491.1–491.5, 280/457, 459, 456.1, 492, 493, 494, 282, 280/482; 403/324, 378
See application file for complete search history.

(56) References Cited

U.S. PATENT DOCUMENTS

| | | | | |
|---|---|---|---|---|
| 1,435,063 A * | 11/1922 | Holmes | | 280/482 |
| 3,326,573 A * | 6/1967 | Neitzey, Jr. | | 280/482 |
| 5,224,960 A * | 7/1993 | Duncan | | 280/491.4 |
| 5,356,166 A * | 10/1994 | Hahne et al. | | 280/491.4 |
| 5,429,382 A * | 7/1995 | Duncan | | 280/491.4 |
| 5,915,715 A * | 6/1999 | Ford | | 280/494 |
| 5,957,477 A * | 9/1999 | Ensz et al. | | 280/482 |
| 7,837,216 B1 * | 11/2010 | Greaves et al. | | 280/491.4 |
| 2007/0114761 A1 * | 5/2007 | Klar | | 280/491.2 |
| 2007/0194557 A1 * | 8/2007 | Caporali et al. | | 280/493 |

* cited by examiner

*Primary Examiner* — Anne Marie Boehler
(74) *Attorney, Agent, or Firm* — Donald R. Schoonover

(57) ABSTRACT

A tow bar having orthogonally-articulated towed-vehicle connectors includes a body element; a first connector element secured to and extending forwardly from the body element, the first connector element being structured to releasably connect the body element to a towing hitch arrangement of a towing vehicle; at least one tow bar leg having a fore end connected to the body element, and an aft end extending rearwardly from the body element; and a second connector element secured to and extending rearwardly from the aft end of the at least one tow bar leg, the second connector element being orthogonally-articulated and structured to releasably connect the aft end of the at least one tow bar leg to a towing hitch arrangement of the towed vehicle.

12 Claims, 2 Drawing Sheets

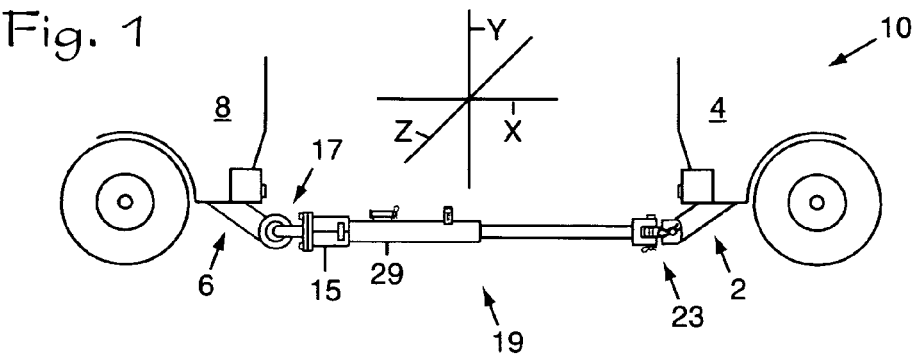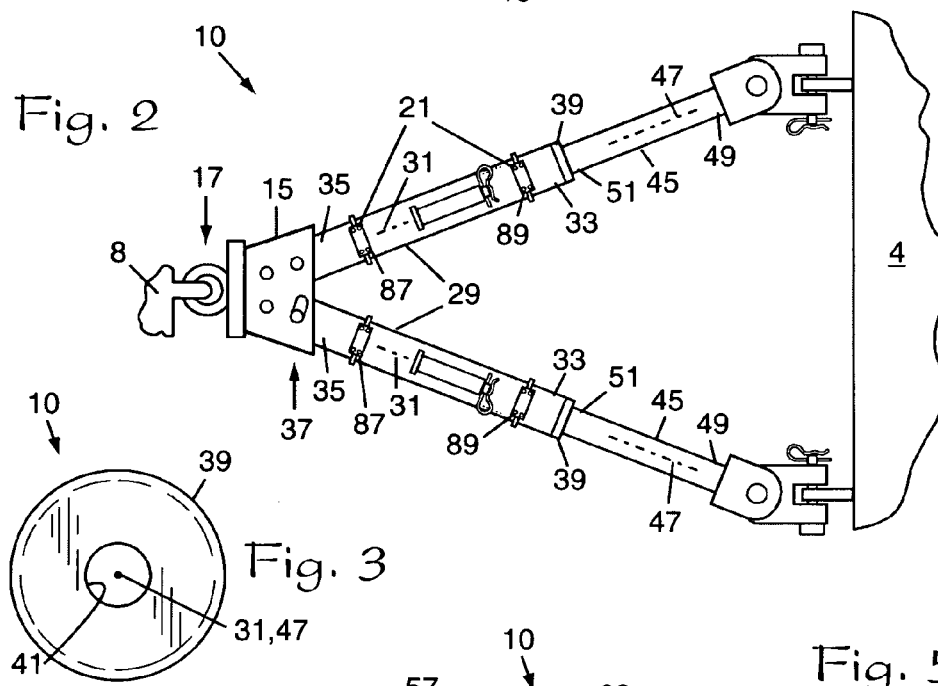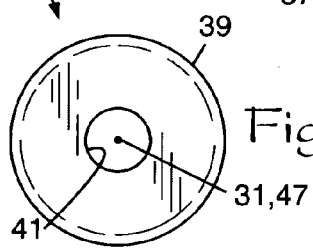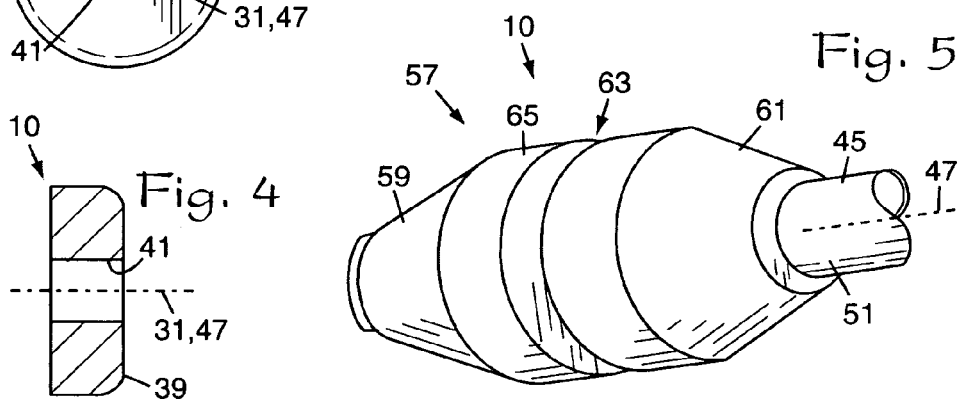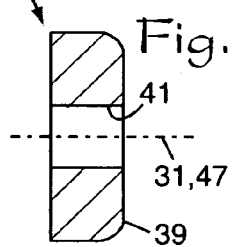

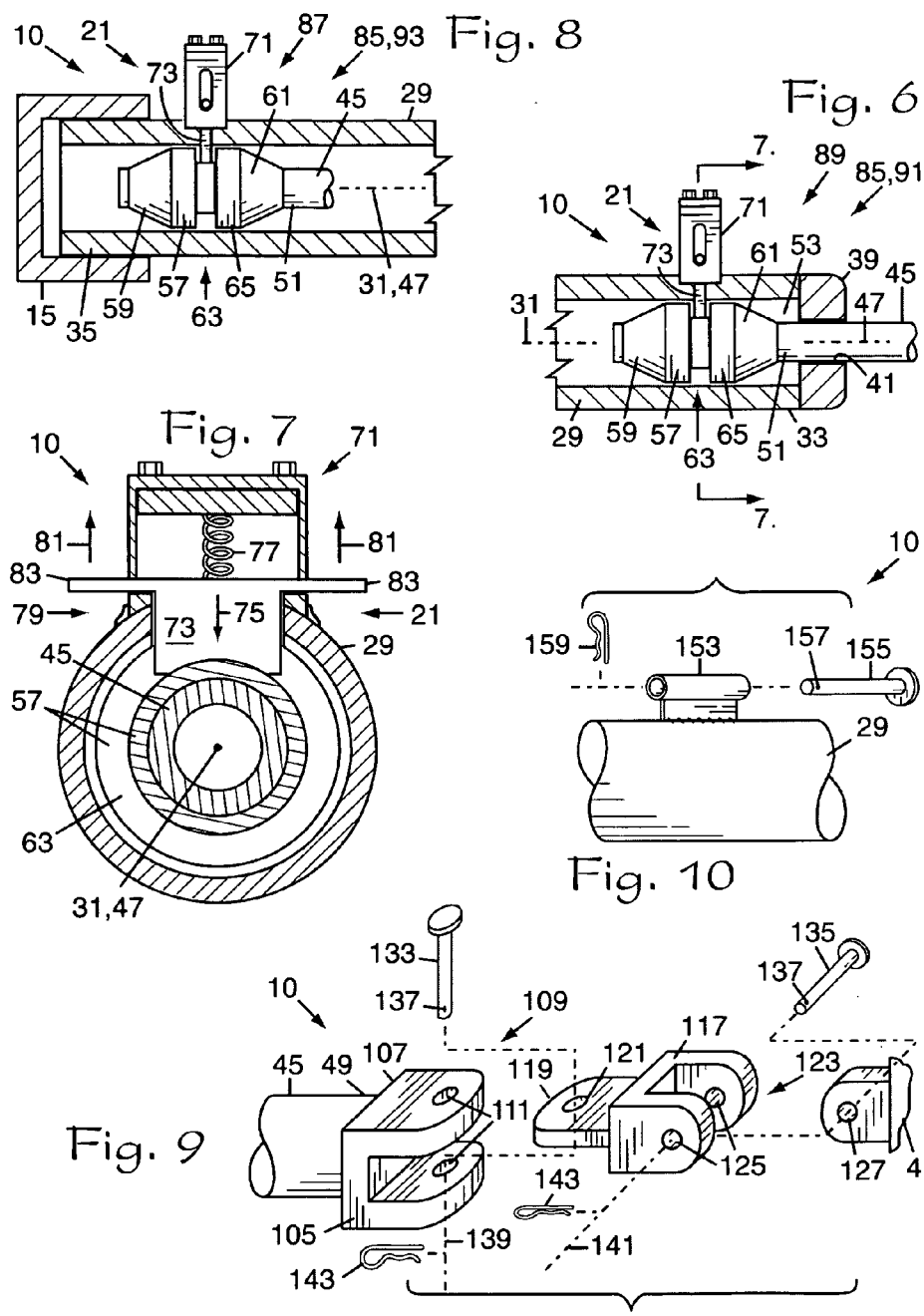

TOW BAR HAVING ORTHOGONALLY-ARTICULATED TOWED-VEHICLE CONNECTORS

BACKGROUND OF THE INVENTION

1. Field of the Invention

The present invention relates to towing accessories and, more particularly without limitation, to tow bars for connecting a towed vehicle to a towing vehicle.

2. Description of the Related Art

A tow bar is generally used for connecting a towing hitch arrangement 2 of a vehicle to be towed, sometimes referred to herein as a towed vehicle 4, to a towing hitch arrangement 6 of a towing vehicle 8. For applications wherein the towed vehicle will be towed at a speed sufficient to move with the flow of traffic on a public roadway, the tow bar, which connects the front end of the towed vehicle to the rear end of the towing vehicle, generally has two tow bar legs with the front ends of the tow bar legs forming the apex of an isosceles triangle and the rear ends of the tow bar legs spaced apart and forming the sides of the triangle. The triangular configuration causes the towed vehicle to closely track the towing vehicle, both along straightaways and around corners.

For tow bar applications, such as where heavy, massive equipment will be moved a relatively short distance, such as where an airliner is to be backed away from a terminal for example, the tow bar generally has only one tow bar leg. For such applications, one end of the tow bar leg may be connected to the front end of the vehicle to be moved and the other end of the tow bar leg connected to the front end of the moving vehicle so the operator of the towing vehicle can face the vehicle to be moved and can carefully observe the response of the towed vehicle as it is being slowly moved by the towing vehicle.

Tow bars for moving towed vehicles rapidly along public roadways must be designed to accommodate variations in attitude that inherently exist between the towing and towed vehicles, which variations are constantly and continuously changing. One such variation in attitude between the vehicles is the instantaneous elevation of the towing vehicle relative to the instantaneous elevation of the towed vehicle. A related variation in attitude between the vehicles is the instantaneous ascent/descent orientation of the towing vehicle relative to the instantaneous ascent/descent orientation of the towed vehicle. Both of these related variations in attitude can be accommodated by apparatus designed to accommodate rotations between the towing and towed vehicles about a transverse, horizontal axis, sometimes referred to as the "pitch" axis, see the "x"-axis in FIG. 1.

Another such variation in attitude between the vehicles is the instantaneous horizontal direction in which the towing vehicle is traveling relative to the instantaneous horizontal direction in which the towed vehicle is traveling, such as when the towed vehicle is being pulled around an unbanked corner for example. This phenomenon, sometimes referred to as "yaw", can be accommodated by apparatus designed to accommodate rotations between the towing and towed vehicles about a vertical axis, see the "y"-axis in FIG. 1.

Finally, another such variation in attitude between the vehicles is the instantaneous sidewise tilt of the towing vehicle relative to the instantaneous sidewise tilt of the towed vehicle, such as the rocking motion which occurs when traversing uneven or rough pavement for example. This phenomenon, sometimes referred to as "roll", can be accommodated by tow bar apparatus designed to accommodate rotations between the towing and towed vehicles about a longitudinal, horizontal axis, see the "z"-axis in FIG. 1.

During actual towing procedures, all combinations of the pitch, yaw and roll phenomena are continuously occurring and changing. Prior art is replete with tow bar designs that have been developed in an attempt to accommodate these phenomena, some of those designs being more successful than others. For example, a ball hitch/ball hitch receiver combination securing a tow bar to a towing vehicle can theoretically accommodate all three of the pitch, yaw and roll criteria. Although the ability of such a combination to accommodate yaw is encouraging, unfortunately the ability of such a combination to accommodate either pitch or roll is extremely limited, where failure to closely abide by those limitations can produce disastrous and even fatal results.

A commonly used arrangement involves using a conventional receiver hitch in combination with a square tube. Although such an arrangement may be convenient for connecting a tow bar to a towing vehicle, this type of connection by itself provides absolutely no ability to accommodating any one of the three pitch, yaw or roll criteria. As a result, the tow bar and/or the connections between the tow bar and the towed vehicle must be relied upon to provide a solution for minimizing the potentially potential detrimental effects of these criteria.

At the same time, an ability to apply such rotations could be very useful while connecting a tow bar to a towed vehicle. Typically, a tow bar is first connected to a towing vehicle 8 followed by connecting the tow bar to the towed vehicle. It is difficult, if not impossible, to perfectly align a towed vehicle with, and perfectly space the towed vehicle from, a towing vehicle so the tow bar legs 18 can be easily and conveniently connected to the towed vehicle. Many towing hitch arrangements of towed vehicles require precise fore-to-aft, horizontal, and angular alignment of the two tow bar leg connectors with the mating connectors of the towing hitch arrangement of the towed vehicle so pivot pins can be inserted horizontally through horizontally-aligned orifices of those mating connectors while the tow bar mating parts are physically held in place relative to those of the towed vehicle. Such activity can be extremely stressful, sometimes requiring the efforts of more than one person, such as when connecting massive tow bars used to tow heavy military equipment for example. Such stress and effort could be reduced considerably if each of the tow bar leg connectors could be individually articulated in close proximity to the towed vehicle so each tow bar leg connector could be easily and conveniently mated with the towing hitch arrangement of the towed vehicle while the pivot pins are inserted.

What is needed is a tow bar having orthogonally-articulated tow bar leg connectors for connecting tow bar legs to the towing hitch arrangement of a towed vehicle.

Some prior art tow bars are designed to provide a storage capability for the tow bar when the tow bar is not being used. Some of those designs are for tow bars that remain connected to the towed vehicle, such as by pivoting the tow bar legs upwardly at the front end of the towed vehicle and securing the tow bar legs in an upright configuration. Needless to say, the result is very unsightly and tends to obstruct forward vision when the towed vehicle is subsequently being driven on its own. This arrangement is not efficient for situations wherein the towing vehicle needs to use the tow bar to pull other towed vehicles.

Accordingly, other prior art tow bars are designed to provide a storage capability wherein the tow bar remains connected to the towing vehicle, such as by pivoting the tow bar legs upwardly or sidewise at the rear end of the towing vehicle and securing the tow bar legs in that configuration by hooking the tow bar legs to another part of the tow bar. Unfortunately, it is not uncommon for such arrangements to become unhooked, especially when the towing vehicle travels over very rough terrain, such as railroad tracks, potholes, and the like.

What is needed is a tow bar wherein the tow bar legs have self-storing capability.

SUMMARY OF THE INVENTION

The improvements of the present invention for a tow bar include a first connector element for connecting a body element thereof to a towing hitch arrangement of a towing vehicle and a pair of rearwardly-extending tow bar legs connected to the body element wherein each tow bar leg includes a hollow outer member with a longitudinal axis, an inner member telescopingly displaceable in the outer member along the longitudinal axis, a locking element wherein the tow bar leg can be extended and releasably locked in a deployed configuration or retracted and releasably locked in a stored configuration, an orthogonally-articulated second connector element for connecting the tow bar leg to a towing hitch arrangement of a towed vehicle, and a pivot pin retainer releasably containing a pivot pin.

Each second connector element includes a first clevis unit secured to the inner member and rotatable about the longitudinal axis, a second clevis unit pivotable about a transversely-oriented first pin axis relative to the first clevis unit, wherein the second clevis unit is also pivotable about a transversely-oriented second pin axis relative to the towing hitch arrangement of the towed vehicle, and wherein the longitudinal, first pin and second pin axes are orthogonally related.

PRINCIPAL OBJECTS AND ADVANTAGES OF THE INVENTION

The principal objects and advantages of the present invention include: providing a tow bar having orthogonally-articulated tow bar leg connectors for connecting tow bar legs of a tow bar to the towing hitch arrangement of a towed vehicle; providing such a tow bar having tow bar legs with internal self-storing capability; and generally providing such a tow bar that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWING FIGURES

FIG. 1 is a side elevational view of a tow bar in use, according to the present invention.

FIG. 2 is a top plan view of the tow bar.

FIG. 3 is an enlarged plan view of an adapter mechanism of the tow bar.

FIG. 4 is an enlarged cross-sectional view of the adapter mechanism of the tow bar.

FIG. 5 is a further enlarged perspective view of a shuttle portion of a locking element of the tow bar.

FIG. 6 is an enlarged side view of the locking element of the tow bar in a locked and deployed configuration.

FIG. 7 is a still further enlarged and cross-sectional view of the locking element taken along line 7-7 of FIG. 6.

FIG. 8 is an enlarged side view of the locking element similar to FIG. 6, but showing the tow bar in a locked and stored configuration.

FIG. 9 is an enlarged and exploded, perspective view of a second connector element of the tow bar.

FIG. 10 is an enlarged, side perspective view of a pin retainer and pin of the tow bar, according to the present invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a tow bar in accordance with the present invention, as shown in FIGS. 1 through 10. The tow bar 10 includes a body element 15, a first connector element 17, at least one tow bar leg 19, at least one locking element 21, and at least one second connector element 23. The following description of the present invention is directed to applications of the present invention for tow bars 10 having a pair of tow bar legs 19. Applications of the present invention for tow bars 10 having only one tow bar leg will be obvious to persons skilled in the tow bar art based on the disclosure herein.

The first connector element 17 is secured to and extends forwardly from the body element 15, as shown in FIGS. 1 and 2. The first connector element 17 is structured to releasably connect the body element 15 to a towing hitch arrangement 6 of a towing vehicle 8. For example, the towing hitch arrangement 6 may be a conventional receiver hitch, a hitch ball, a pintle, or other suitable arrangement and the first connector element 17 may be a tube for a conventional receiver hitch, a hitch ball receiver, a lunette ring, or other suitable arrangement.

The tow bar legs 19 extend rearwardly from the body element 15. Each of the tow bar legs 19 includes a hollow outer member 29 having a first axis 31, an aft end 33, and a fore end 35 secured to the body element 15. Preferably, at least one of the fore ends 35 of the outer members 29 of the tow bar legs 19 is pivotally secured to the body element 15, as indicated by the arrow designed by numeral 37 in FIG. 2, so the tow bar legs 19 can be pivoted to a side-by-side arrangement to thereby facilitate storage and transportation of the tow bar 10 when the tow bar 10 is not being used.

Each of the tow bar legs 19 also includes an adapter mechanism 39. Each adapter mechanism 30, which includes an adapter orifice 41 therethrough, as shown in FIGS. 3 and 4, is secured to the aft end 33 of the outer member 29 with the adapter orifice 41 axially aligned with the first axis 31, as shown in FIG. 6.

Each of the tow bar legs 19 also includes an inner member 45 having a second axis 47, an aft end 49, and a fore end 51 dimensioned to be slidably insertable through the adapter orifice 41 and into the outer member 29 with the second axis 47 colinearly aligned with the first axis 31, wherein an annular cavity 53 is formed between the outer member 29 and the inner member 45, as shown in FIG. 6. Each of the tow bar legs 19 includes one of the locking elements 21. The locking element 21 includes a cylindrically-shaped shuttle portion 57 secured to and encircling the inner member 45 of the tow bar leg 19. The shuttle portion 57 has tapered fore and aft shuttle ends 59, 61 and a peripheral groove 63 arranged around an outer extremity 65 thereof. The shuttle portion 57 is dimensioned wherein the inner member 45 with the shuttle portion 57 secured thereto, as shown in FIGS. 6 and 8, is slidably, longitudinally and telescopingly displaceable in the outer member 29 along the first axis 31 of the outer member 29.

Each locking element 21 also includes at least one latching portion 71, wherein each latching portion 71 is secured to and extends through the outer member 29 of the tow bar leg 19. Each latching portion 71 includes a shovel device 73 that is radially displaceable relative to the outer member 29.

Preferably, each latching portion 71 also includes a biasing mechanism 77, such as a spring or other resilient device for example, which is structured to operatively bias the shovel device 73 radially inwardly relative to the outer member 29, as indicated by the arrow designated by numeral 75 in FIG. 7, wherein the shovel device 73 normally extends into the path of the tapered fore and aft shuttle ends 59, 61 as the inner member 45 with the shuttle portion 57 is displaced in the outer member 29 along the first axis 31 as described herein.

Each latching portion 71 also includes a release mechanism 79 connected to the shovel device 73 and structured to enable a user to manually displace the shovel device 73 radially outwardly relative to the outer member 29, as indicated by arrows designated by numeral 81 in FIG. 7, such as a pair of opposing extenders 83 for example.

The following is a description of the basic function of each locking element 21. As the inner member 45 of a tow bar leg 19 is being longitudinally displaced relative to the respective outer member 28 wherein the tapered fore shuttle end 59 or tapered aft shuttle end 61 of the shuttle portion 57 is forced against the shovel device 73 thereby displacing the shovel device 73 radially outwardly relative to the first axis 31 and, as the shovel device 73 slides over the shuttle portion 57 and passes over the peripheral groove 63 of the shuttle portion 59, the biasing mechanism 77 of the latching portion 71 automatically biases the shovel device 73 into the peripheral groove 63 of the shuttle portion 57, thereby locking the tow bar leg 19 in a locked configuration 85, as shown in FIG. 6, wherein the inner member 45 is no longer displaceable relative to the outer member 29 of the tow bar leg 19.

Subsequently, the release mechanism 79 can be used to lift the shovel device 73 out of the peripheral groove 63 as indicated by arrow 81 in FIG. 7, thereby overcoming the biasing action of the biasing mechanism 77 and, while the shovel device 73 is lifted out of the peripheral groove 63, the inner member 45 and shuttle portion 59 can be displaced relative to the outer member 29 so the shovel device 73 is no longer aligned with the peripheral groove 63 and releasing of the release mechanism 79 to place the tow bar leg 19 in an unlocked configuration wherein the inner member 45 can then be displaced relative to the outer member 29.

Since it is difficult, if not impossible, to perfectly align a towed vehicle with, and perfectly space a towed vehicle from, a towed vehicle, the tow bar legs 19 of the present invention are structured to simplify connection to the towed vehicle 4 as follows: each locking element 21 of each tow bar leg 19 includes the shuttle portion 59 of the locking element 21 being mounted near the fore end 51 of the inner member 45 and the latching portion 71 consisting of identical fore and aft latching portions 87, 89. The fore latching portion 87 is mounted near the fore end 35 of the outer member 29, as shown in FIG. 8, and the aft latching portion 89 is mounted near the aft end 33 of the outer member 29, as shown in FIG. 6.

With the tow bar 10 connected to the towing vehicle 8 and the tow bar legs 19 in the unlocked configuration, the tow bar legs 19 are connected to the towed vehicle 4 as hereinafter described in greater detail. The towing vehicle 8 is then eased forwardly relative to the towed vehicle 4 causing each aft latching portion 89 to be displaced rearwardly toward the respective shuttle portion 57 until the shovel device 73 of the aft latching portion 89 is forced against the tapered aft shuttle end 61 of the shuttle portion 57 thereby displacing the shovel device 73 of the aft latching portion 89 radially outwardly relative to the first axis 31 and, as the shovel portion 73 of the aft latching portion 89 slides over the shuttle portion 57 and passes over the peripheral groove 63 of the shuttle portion 57, the biasing mechanism 77 of the aft latching portion 89 automatically biases the shovel device 73 of the aft latching portion 89 into the peripheral groove 63 of the shuttle portion 57, thereby locking the tow bar leg 19 in a locked and deployed configuration 85, 91, as shown in FIG. 6. When both of the tow bar legs 19 have been so locked in the locked and deployed configuration 85, 91, the towed vehicle 4 is then properly aligned with, and spaced at a desired predetermined distance from, the towing vehicle 8.

Later, when the tow bar 10 is no longer being used and, with the tow bar legs 19 in the unlocked configuration, the inner member 45 of each tow bar leg 19 can be longitudinally displaced in the outer member 29 toward the body element 15, wherein the tapered fore shuttle end 59 is forced against the shovel device 73 of the fore latching portion 87 displacing the shovel device 73 of the fore latching portion 87 radially outwardly relative to the third axis 31 and, as the shovel device 73 of the fore latching portion 87 slides over the shuttle portion 57 and passes over the peripheral groove 63 of the shuttle portion 57, the biasing mechanism 77 of the fore latching portion 87 automatically biases the shovel device 73 of the fore latching portion 87 into the peripheral groove 63 of the shuttle portion 57, thereby locking the tow bar leg 19 in a locked and stored configuration 85, 93, as shown in FIG. 8, wherein the inner member 45 cannot (until subsequently released as described herein) be displaced relative to the outer member 29 of the tow bar leg 19.

Each of the tow bar legs 19 includes one of the second connector elements 23. Each of the second connector elements 23 includes a first clevis unit 105 having a first clevis end 107 secured to the aft end 49 of the inner member 45 of the respective tow bar leg 19. The first clevis unit 105 also includes a pair of rearwardly-extending first clevis legs 109 having aligned first clevis orifices 111 therethrough, as shown in FIG. 10.

Each second connector element 23 also includes a second clevis unit 117 having a second clevis end 119 with a second clevis orifice 121 therethrough. The second clevis end 119 is dimensioned to be removably insertable between the pair of first clevis legs 109, wherein the second clevis orifice 121 is alignable with the first clevis orifices 111 of the pair of first clevis legs 109. The second clevis unit 117 also includes a pair of rearwardly-extending second clevis legs 123 having aligned third clevis orifices 125 therethrough, wherein the third clevis orifices 125 are alignable with an orifice 127 of the towing hitch arrangement 2 of the towed vehicle 4.

Each second connector element 23 also includes first and second pivot pins 133, 135 having bores 137 therethrough. The first pivot pin 133 is dimensioned to be removably insertable through both the second clevis orifice 121 of the second clevis unit 117 and the first clevis orifices 111 of the first clevis unit 105, wherein the second clevis unit 117 is pivotable about the first pivot pin 133 relative to the first clevis unit 105, sometimes referred to herein as a first pin axis 139.

Similarly, the second pivot pin 135 is dimensioned to be removably insertable through both the orifice 127 of the towing hitch arrangement 2 of the towed vehicle 4 and the third clevis orifices 125 of the second clevis unit 117, wherein the second clevis unit 117 is pivotable about the second pivot pin 135 relative to the towing hitch arrangement 2 of the towed vehicle 4, sometimes referred to herein as a second pin axis 141.

Cotter-type pins 143 removably insertable through bores 137 of the first and second pivot pins 133, 135 releasably secure the first and second pivot pins 133, 135 in the towing hitch arrangement 2 and the first and second clevis units 105, 117. Preferably, the sizing and dimensions of the second pivot pin 135 are identical to those of the first pivot pin 133.

As hereinbefore discussed, it is difficult, if not impossible, to perfectly align a towed vehicle with, and perfectly space the towed vehicle from, a towing vehicle in preparation for connecting tow bar legs to a towing vehicle. It should be noted that each of the second connector elements 23 is structured to easily, conveniently and separately accommodate imperfect spacing and alignment between the towed and towing vehicles 4,8. This arises from the ability of the second clevis unit 117 to be pivoted about the first pin axis 139 relative to the first clevis unit 105 simultaneously with the ability of the inner member 45 to be rotated about the first axis 31 relative to its respective outer member 29 thereby enabling orthogonal articulation of each second connector element 23 relative to the towing hitch arrangement 2 of the towed vehicle 4. Then, after connecting the second connector element 23 to the towed vehicle 4, the added combination of the further orthogonal articulation provided by the ability of the second clevis unit 117 to also be simultaneously pivoted about the second pin axis 141 relative to the towing hitch arrangement 2 of the towed vehicle 4 enables the second connector element 23 to assist other components of the tow bar 10 in accommodating all three pitch, yaw and roll components between the towing and towed vehicles, which is a substantial improvement over the no-axis or single-axis articulation provided by prior art tow bar connections between the tow bar legs of a tow bar and a towed vehicle.

The tow bar 10 of the present invention may include a pin retainer 153 secured to the tow bar 10, such as to one or each of the outer members 29 of the tow bar legs 19 for example. Each pin retainer 153 includes a third pivot pin 155 having a bore 157 therethrough, wherein the third pivot pin 155 is sized and dimensioned to replace the first or second pivot pins 133, 135. The pin retainer 153 also includes a cotter-type pin 159 through bore 157 of the third pivot pin 155 to releasably secure the third pivot pin 155 in the pin retainer 153.

In an application of the present invention, the rear end of the towing vehicle 8 is temporarily positioned forwardly from the front end of the towed vehicle 4. The fore-and-aft orientations of the two vehicles do not need to be perfectly aligned, nor does the spacing between the vehicles need to be exact. The first connector element 17 is then securely connected to the towing hitch arrangement 6 of the towing vehicle 8 as appropriate.

If the tow bar legs 19 are in the stored configuration 93, the release mechanisms 79 are manipulated allowing the tow bar legs 19 to be placed in an unlocked configuration so the inner members 45 of the tow bar legs 19 can be displaced longitudinally relative to their respective outer members 29. One of the tow bar legs 19 is then separately extended or retracted as necessary to adjust its length to accommodate the temporary spacing between the two vehicles while the inner member 45 thereof is rotated relative to its outer member 29 and the second clevis unit 117 of its second connector element 23 is pivoted about the first pivot pin 133 relative to the first clevis unit 105 in order to easily and conveniently align the third clevis orifices 125 with the orifice 127 through the towing hitch arrangement 2 of the towed vehicle 4. The second pivot pin 135 is then inserted through the orifices 125, 127 and secured in place with the cotter-type pin 143. A similar procedure is then followed with respect to the other tow bar leg 19.

After both tow bar legs 19 have been so connected to the towing hitch arrangement 2 of the towed vehicle 4, the towing vehicle 8 is slowly eased forwardly relative to the towed vehicle 4 causing the shovel device 73 of the aft latching portion 89 of each tow bar leg 19 to be biased into the peripheral groove 63 of the respective shuttle portion 57, thereby locking both tow bar legs 19 in the deployed configuration 85, 91. The towed vehicle 4 is then properly aligned with, and spaced at a desired predetermined distance from, the towing vehicle 8. After attaching safety chains and making necessary electrical and braking connections, the towed vehicle 4 is ready to be towed.

It is to be understood that while certain forms of the present invention have been illustrated and described herein, it is not to be limited to the specific forms or arrangement of parts as described and shown.

What is claimed and desired to be covered by Letters Patent is as follows:

1. A tow bar for connecting a towed vehicle to a towing vehicle, the tow bar comprising:
    (a) a body element;
    (b) a first connector element secured to and extending forwardly from the body element, the first connector element being structured to releasably connect the body element to a towing hitch arrangement of a towing vehicle;
    (c) at least one tow bar leg extending rearwardly from the body element; each at least one tow bar leg having:
        (1) a hollow outer member with a fore end connected to the body element, an aft end and a first axis, and
        (2) an inner member with an aft end and a second axis;
    (d) a second connector element secured to and extending rearwardly from the aft end of the inner member of the at least one tow bar leg, the second connector element being orthogonally-articulated and structured to releasably connect the aft end of the at least one tow bar leg to a towing hitch arrangement of the towed vehicle; and
    (e) a locking element secured to each at least one tow bar leg, each locking element including:
        (1) at least one latching portion having a radially displaceable shovel device, the at least one latching portion being secured to and extending through the outer member, and
        (2) a cylindrically-shaped shuttle portion having tapered fore and aft shuttle ends and a peripheral groove arranged around an outer extremity thereof to receive the shovel device, the shuttle portion being secured to the inner member and structured wherein the inner member with the shuttle portion secured thereto is slidably, longitudinally, and telescopingly displaceable in the outer member, and
        (3) wherein the shuttle portion and the at least one latching portion are structured to cooperatively:
            (A) provide a locked configuration wherein displacement of the inner member relative to the outer member is prevented, and (B) provide an unlocked configuration wherein displacement of the inner member relative to the outer member is allowed.

2. A tow bar as defined in claim 1, wherein the second connector element comprises:
   (a) a first clevis unit including:
      (1) a first clevis end secured to the aft end of the inner member of the at least one tow bar leg, and
      (2) a pair of rearwardly-extending first clevis legs having aligned first clevis orifices therethrough;
   (b) a second clevis unit including:
      (1) a second clevis end with a second clevis orifice therethrough, the second clevis end dimensioned to be insertable between the pair of first clevis legs, wherein the second clevis orifice is alignable with the first clevis orifices of the pair of first clevis legs, and
      (2) a pair of rearwardly-extending second clevis legs having aligned third clevis orifices therethrough, wherein the third clevis orifices are alignable with an orifice of the towing hitch arrangement of the towed vehicle; and
   (c) first and second pivot pins having bores therethrough, wherein:
      (1) the first pivot pin is dimensioned to be insertable through both the second clevis orifice of the second clevis unit and the first clevis orifices of the first clevis unit, wherein the second clevis unit is pivotable about the first pivot pin relative to the first clevis unit,
      (2) the second pivot pin is dimensioned to be insertable through both the orifice of the towing hitch arrangement of the towed vehicle and the third clevis orifices of the second clevis unit, wherein the second clevis unit is pivotable about the second pivot pin relative to the towing hitch arrangement of the towed vehicle, and
      (3) cotter pins dimensioned to be removably insertable through bores of the first and second pivot pins to thereby releasably secure the first and second pivot pins through the towing hitch arrangement of the towed vehicle and the first and second clevis units.

3. A tow bar as defined in claim 2, further comprising a pin retainer secured to the tow bar, the pin retainer including:
   (a) a third pivot pin having a bore therethrough, the third pivot pin being sized and dimensioned to replace the first or second pivot pins, and
   (b) a cotter pin dimensioned to be removably insertable through the bore of the third pivot pin to thereby releasably secure the third pivot pin in the pin retainer.

4. A tow bar as defined in claim 1, wherein the at least one tow bar leg includes:
   (a)
      an adapter mechanism having an adapter orifice therethrough, wherein the adapter mechanism is secured to the aft end of the outer member of the at least one tow bar leg with the adapter orifice axially aligned with the first axis; and
   (b) the inner member having a second axis and a fore end dimensioned to be slidably insertable through the adapter orifice and into the outer member with the second axis colinearly aligned with the first axis.

5. A tow bar as defined in claim 1, wherein the at least one tow bar leg comprises one tow bar leg.

6. A tow bar as defined in claim 1, wherein the at least one tow bar leg comprises two tow bar legs arranged generally horizontally from each other.

7. A tow bar for connecting a towed vehicle to a towing vehicle, the tow bar comprising:

(a) a body element;
   (b) a first connector element secured to and extending forwardly from the body element, the first connector element being structured to releasably connect the body element to a towing hitch arrangement of a towing vehicle;
   (c) a pair of tow bar legs extending rearwardly from the body element, each tow bar leg including:
      (1) a hollow outer member having a first axis, an aft end, and a fore end secured to the body element,
      (2) an adapter mechanism having an adapter orifice therethrough, wherein the adapter mechanism is secured to the aft end of the outer member with the adapter orifice axially aligned with the first axis, and
      (3) an inner member having a second axis, an aft end, and a fore end dimensioned to be slidably insertable through the adapter orifice and into the outer member with the second axis colinearly aligned with the first axis;
   (d) a pair of locking elements, each secured to a respective one of the pair of tow bar legs and including:
      (1) a cylindrically-shaped shuttle portion secured to and encircling the inner member of the tow bar leg, the shuttle portion having tapered fore and aft shuttle ends and a peripheral groove arranged around an outer extremity of the shuttle portion, the shuttle portion being dimensioned wherein the inner member with the shuttle portion secured thereto is slidably, longitudinally, and telescopingly displaceable in the outer member along the first axis,
      (2) a first latching portion secured to and extending through the outer member near the fore end thereof, and
      (3) a second latching portion secured to and extending through the outer member near the aft end thereof, each of the first and second latching portions including:
         (A) a shovel device displaceable radially relative to the outer member,
         (B) a biasing mechanism structured to operatively bias the shovel device radially inwardly relative to the outer member, and
         (C) a release mechanism connected to the shovel device and structured to enable a user to manually displace the shovel device radially outwardly relative to the outer member; and
      (4) each locking element being structured wherein:
         (A) as the inner member is being displaced longitudinally along the outer member and toward the body element, the tapered fore shuttle end is forced against the shovel device of the first latching portion displacing the shovel device of the first latching portion radially outwardly relative to the first axis and, as the shovel device of the first latching portion slides over the shuttle portion and passes over the peripheral groove of the shuttle portion, the biasing mechanism of the first latching portion automatically biases the shovel device of the first latching portion into the peripheral groove, thereby locking the inner member in a locked and stored configuration relative to the outer member; and
         (B) as the inner member is being displaced longitudinally along the outer member and away from the body element, the tapered aft shuttle end is forced against the shovel device of the second latching portion displacing the shovel device of the second latching portion radially outwardly relative to the first axis and, as the shovel device of the second latching portion slides over the shuttle portion and passes over the peripheral groove of the shuttle portion, the biasing mechanism of the second latching portion automatically biases the shovel device of the second latching portion into the peripheral groove, thereby locking the inner member in a locked and deployed configuration relative to the outer member; and (e) a pair of second connector elements, each second connector element extending rearwardly from a respective one of the pair of tow bar legs and including:
  (1) a first clevis unit having:
    (A) a first clevis end secured to the aft end of the inner member, and
    (B) a pair of rearwardly-extending first clevis legs having aligned first clevis orifices therethrough;
  (2) a second clevis unit including:
    (A) a second clevis end with a second clevis orifice therethrough, the second clevis end dimensioned to be removably insertable between the pair of first clevis legs, wherein the second clevis orifice is alignable with the first clevis orifices of the pair of first clevis legs, and
    (B) a pair of rearwardly-extending second clevis legs having aligned third clevis orifices therethrough, wherein the third clevis orifices are alignable with an orifice of the towing hitch arrangement of the towed vehicle; and
  (3) first and second pivot pins having bores therethrough, wherein:
    (A) the first pivot pin is dimensioned to be removably insertable through both the second clevis orifice of the second clevis and the first clevis orifices of the first clevis unit, wherein the second clevis unit is pivotable about the first pivot pin relative to the first clevis unit,
    (B) the second pivot pin is dimensioned to be removably insertable through both the orifice of the towing hitch arrangement of the towed vehicle and the third clevis orifices of the second clevis unit, wherein the second clevis unit is pivotable about the second pivot pin relative to the towing hitch arrangement of the towed vehicle, and
    (C) cotter pins dimensioned to be removably insertable through the bores of the first and second pivot pins to thereby releasably secure the first and second pivot pins through the towing hitch arrangement of the towed vehicle and the first and second clevis units; and (f) at least one pin retainer secured to the tow bar wherein each pin retainer includes:
  (1) a third pivot pin having a bore therethrough, the third pivot pin being sized and dimensioned to replace the first or second pin, and
  (2) a cotter pin structured to be removably insertable through the bore of the third pivot pin to thereby releasably secure the third pivot pin in the pin retainer.

8. A tow bar for connecting a towed vehicle to a towing vehicle, the tow bar comprising:
(a) a body element;
(b) a first connector element secured to and extending forwardly from the body element, the first connector element being structured to releasably connect the body element to a towing hitch arrangement of a towing vehicle;
(c) at least one tow bar leg having a fore end connected to the body element, and an aft end extending rearwardly from the body element; each at least one tow bar leg including:
  (1) a hollow outer member having a first axis and an aft end;
  (2) an adapter mechanism having an adapter orifice therethrough, wherein the adapter mechanism is secured to the aft end of the outer member with the adapter orifice axially aligned with the first axis;
  (3) an inner member having a second axis and a fore end dimensioned to be slidably insertable through the adapter orifice and into the outer member with the second axis colinearly aligned with the first axis; and
  (4) a locking element including:
    (A) a cylindrically shaped shuttle portion having fore and aft shuttle ends and also having a peripheral groove arranged around an outer extremity of the shuttle portion, the shuttle portion being secured to and encircling the inner member and structured wherein the inner member with the shuttle portion secured thereto is slidably, longitudinally, and telescopingly displaceable along the first axis of the outer member,
    (B) at least one latching portion including a shovel device radially displaceable relative to the outer member, the at least one latching portion being secured to and extending through the outer member, and
    (C) wherein the shuttle and the at least one latching portion are structured to:
      (i) cooperatively provide a locked configuration wherein displacement of the inner member relative to the outer member is prevented, and
      (ii) provide an unlocked configuration wherein displacement of the inner member relative to the outer member is allowed; and
(d) a second connector element secured to and extending rearwardly from the aft end of the at least one tow bar leg, the second connector element being orthogonally-articulated and structured to releasably connect the aft end of the at least one tow bar leg to a towing hitch arrangement of the towed vehicle;
(e) wherein in the locked configuration, the shovel device of the at least one latching portion extends into the peripheral groove of the shuttle portion, and wherein in the unlocked configuration, the shovel device of the at least one latching portion does not extend into the peripheral groove of the shuttle portion.

9. A tow bar as defined in claim 8, wherein the at least one latching portion includes a biasing mechanism structured to operatively bias the shovel device radially inwardly relative to the outer member.

10. A tow bar as defined in claim 9, including the locking element being structured wherein, as the inner member is being displaced longitudinally relative to the outer member, the tapered fore shuttle end or the tapered aft shuttle end of the shuttle portion bears against the shovel device causing the shovel device to be displaced radially outwardly relative to the first axis and, as the shovel device slides over the shuttle portion and passes over the peripheral groove, the biasing mechanism automatically biases the shovel device into the peripheral groove thereby locking the inner member in a locked configuration relative to the outer member.

11. A tow bar as defined in claim 10, wherein the locking element includes:

(a) the shuttle portion being secured to the inner member of the at least one tow bar leg near the fore end thereof; and
(b) the at least one latching portion includes first and second latching portions secured to the outer member of the at least one two bar leg wherein:
  (1) the first latching portion is secured near the fore end of the outer member and, as the inner member is being displaced longitudinally along the outer member and toward the body element relative to the outer member and the tapered fore shuttle end of the shuttle portion is forced against the shovel device of the first latching portion, the shuttle portion displaces the shovel device of the first latching portion radially outwardly relative to the first axis and, as the shovel device of the first latching portion slides over the shuttle portion and passes over the peripheral groove, the biasing mechanism of the first latching portion automatically biases the shovel device of the first latching portion into the peripheral groove, thereby locking the inner member in a locked and stored configuration relative to the outer member, and
  (2) the second latching portion is secured near the aft end of the outer member and, as the inner member is being displaced longitudinally along the outer member and away from the body element and the tapered aft shuttle end of the shuttle portion is forced against the shovel device of the second latching portion, the shuttle portion displaces the shovel device of the second latching portion radially outwardly relative to the first axis and, as the shovel device of the second latching portion slides over the shuttle portion and passes over the peripheral groove, the biasing mechanism of the second latching portion automatically biases the shovel device of the second latching portion into the peripheral groove, thereby locking the inner member in a locked and deployed configuration relative to the outer member.

12. A tow bar as defined in claim 9, wherein the latching portion further comprises a release mechanism connected to the shovel device and structured to enable a user to manually displace the shovel device radially outwardly relative to the outer member, thereby displacing the shovel device radially outwardly relative to the outer member which, when the tow bar leg is in the locked configuration, withdraws the shovel device from the peripheral groove of the shuttle portion.

* * * * *